US010421054B2

(12) United States Patent
Kwon et al.

(10) Patent No.: US 10,421,054 B2
(45) Date of Patent: *Sep. 24, 2019

(54) FLUIDIZED BED REACTION SYSTEM AND METHOD OF PRODUCING TITANIUM TETRACHLORIDE

(71) Applicant: BIC TECHNOLOGIES GROUP, LLC, Los Angeles, CA (US)

(72) Inventors: Young Jin Kwon, Beverly Hills, CA (US); Gordon Chun, Midvale, UT (US); Jeong Hi Kim, Seoul (KR)

(73) Assignee: BIC TECHNOLOGIES GROUP, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/022,546

(22) Filed: Jun. 28, 2018

(65) Prior Publication Data

US 2018/0304220 A1    Oct. 25, 2018

Related U.S. Application Data

(63) Continuation of application No. 15/601,822, filed on May 22, 2017, now Pat. No. 10,010,846, which is a continuation of application No. 14/585,610, filed on Dec. 30, 2014, now Pat. No. 9,656,231.

(51) Int. Cl.
  *B01J 8/18*   (2006.01)
  *B01J 8/44*   (2006.01)
  *C01G 23/02*  (2006.01)

(52) U.S. Cl.
  CPC .......... *B01J 8/1809* (2013.01); *B01J 8/1827* (2013.01); *B01J 8/1836* (2013.01); *B01J 8/44* (2013.01); *C01G 23/022* (2013.01); *B01J 2208/00327* (2013.01); *B01J 2208/00548* (2013.01); *B01J 2208/00681* (2013.01); *B01J 2208/00752* (2013.01); *B01J 2208/00902* (2013.01); *B01J 2208/00991* (2013.01)

(58) Field of Classification Search
  CPC ...... B01J 8/1809; B01J 8/1827; B01J 8/1836; B01J 8/245; B01J 8/44; B01J 2208/00681; B01J 2208/00991; B01J 2208/00902; C01G 23/022
  See application file for complete search history.

(56) References Cited

U.S. PATENT DOCUMENTS

| | | |
|---|---|---|
| 2,184,887 A | 12/1939 | Muskat et al. |
| 2,701,180 A | 2/1955 | Krchma |
| 3,074,777 A | 1/1963 | Cortes |

*Primary Examiner* — Lessanework Seifu
(74) *Attorney, Agent, or Firm* — Knobbe Martens Olson & Bear LLP

(57) ABSTRACT

This disclosure relates to a fluidized bed reaction system and method for continuous production of titanium tetrachloride from titanium-bearing materials containing high concentrations of alkaline earth metal impurities. Agglomerated heavy particles in a reaction are taken out continuously from a chlorination reactor without clogging and stopping. The reactors and related methods disclosed apply to the chlorination of titanium slag containing high content of alkaline earth metal oxides of up to 15% by weight.

20 Claims, 4 Drawing Sheets

FLUIDIZED BED REACTION SYSTEM AND METHOD OF PRODUCING TITANIUM TETRACHLORIDE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The disclosure relates to a fluidized bed reactor for producing titanium chloride from titanium-bearing slags.

Description of the Related Art

Titanium tetrachloride can be prepared from chlorination of titanium-bearing raw material in a reducing atmosphere via a carbochlorination reaction. Carbochlorination is a high temperature (800-1000° C.) reaction performed in the presence of $Cl_2$ gas and petroleum coke as a reducing agent. The chlorinator applies either fixed-bed chlorination or fluidized bed chlorination methods.

In a fixed-bed chlorination method, ground, powdered titanium-bearing raw material is mixed with petroleum coke and a binder, and is formed into briquettes. Fixed-bed chlorination methods are rarely used today due to low reaction rate and low heat transfer efficiency. In fluidized-bed chlorination methods, titanium-bearing raw material and coke are fluidized by $Cl_2$ and other process gases associated with a carbochlorination reaction. Titanium-bearing slag has 65-95% $TiO_2$ as a major component and other minor components ($Fe_2O_3$, MgO, CaO, $SiO_2$, $Al_2O_3$).

Presently, only titanium slag having a content of MgO and CaO less than 0.1% is acceptable as a feedstock for continuous $TiCl_4$ production in fluidized-bed carbochlorination commercial plant.

SUMMARY

Disclosed herein is a fluidized bed reactor configuration and related methods that enable continuous production of titanium tetrachloride from titanium-bearing materials containing high concentrations of alkaline earth metal impurities through fluidized-bed carbochlorination.

One aspect of the invention provides a titanium chlorination fluidized bed reaction system. The system comprises: a reaction vessel lined with a refractory material configured to withstand a high temperature environment of over 1000° C. for running the following reaction therein: $TiO_2+2Cl_2+C \rightarrow TiCl_4+CO/CO_2$; a baseplate providing a base for the reaction vessel and comprising a center portion and a rim portion around the center portion, the center portion comprising a recessed center surface, the rim portion comprising a rim surface that is elevated from the recessed center surface; a collection zone being a space defined by the recessed center portion of the baseplate and configured for collecting the agglomerated particles containing high content of molten alkaline earth metal chlorides while running the reaction in the reaction vessel; a reaction zone being a space is above the collection zone and the rim surface, in which the reaction is occurring primarily within the reaction vessel; a plurality of rim nozzles formed through the rim surface of the baseplate and configured for supplying fluidizing gas directly into the reaction zone; a plurality of center nozzles formed through the recessed center surface of the baseplate and configured for supplying fluidizing gas into the reaction zone via the collection zone; and a gas flow control for controlling flow of the fluidizing gas to the plurality of rim nozzles and to the plurality of center nozzles, wherein the system is configured to control a linear fluidizing velocity of the fluidizing gas supplied through the plurality of center nozzles to be substantially lower than a linear fluidizing velocity of the fluidizing gas supplied through the plurality of rim nozzles when the system is running for the chlorination reaction in the reaction vessel.

In the foregoing system, the system is configured to control the linear fluidizing velocity of the fluidizing gas supplied through the plurality of center nozzles to be about 30% to about 90% of the linear fluidizing velocity of the fluidizing gas supplied through the plurality of rim nozzles. The system may further comprise a discharge outlet in fluid communication with the recessed center portion of the baseplate and configured for discharging substances collected in the collection zone. The system may further comprise a discharge control configured to control the discharge outlet either continuously or intermittently.

Still in the foregoing system, the baseplate may further comprise a degasifying section further recessed from the recessed center portion for temporarily storing the agglomerated particles containing high content of molten alkaline earth metal chlorides from the collection zone and for stripping chlorine gas from the agglomerated particles containing high content of molten alkaline earth metal chlorides therein. The system may further comprise a purge gas supply connected to the degasifying section for supplying the purge gas into the degasifying section for use in stripping chlorine gas from the agglomerated particles containing high content of molten alkaline earth metal chlorides. The purge gas may be selected from the group consisting of nitrogen, argon, oxygen or a mixture of one or more of the foregoing. The degasifying section may be provided between the collection zone and the discharge outlet such that substances after degasifying are to be discharged through the discharge outlet.

Still in the foregoing system, the system may further comprise a first manifold and a second manifold, wherein the first manifold is connected to the plurality of rim nozzles for supplying the fluidizing gas to the plurality of rim nozzles, wherein the second manifold is connected to the plurality of center nozzles for supplying the fluidizing gas to the plurality of center nozzles. The gas flow control may comprise a plurality of gas flow regulators for regulating gas flow to each of the plurality of rim nozzles and the plurality of center nozzles. Each of the plurality of rim nozzles has a first aperture size and each of the plurality of center nozzles has a second aperture size, wherein the first aperture size may be smaller than the second aperture size.

Another aspect of the invention provides a method of producing titanium tetrachloride. The method comprises: providing the foregoing system; introducing $TiO_2$-containing slag into the reaction vessel; introducing fluidizing gas comprising chlorine gas into the reaction vessel through the plurality of rim nozzles and the plurality of center nozzles for running the reaction within the reaction vessel, wherein a linear fluidizing velocity of the fluidizing gas supplied through the plurality of rim nozzles is substantially higher than a linear fluidizing velocity of the fluidizing gas supplied through the plurality of center nozzles such that particles containing high content of molten alkaline earth metal chloride settle into the collection zone; and discharging substances from the collection zone through the discharge outlet.

In the foregoing method, the system may comprise a discharge controller for controlling operation of the discharge outlet, wherein discharging of the substances is performed continuously or intermittently. The baseplate may further comprise a degasifying section further recessed from the recessed center portion, wherein the system may further comprise a purge gas supply connected to the degasifying section, wherein the method may further comprise: introducing the purge gas into the degasifying section and stripping at least part of chlorine gas from the agglomerated particles containing high content of molten alkaline earth metal chlorides that has settled in the collection zone and transferred into the degasifying section from the collection zone.

Still in the foregoing method, the purge gas may be selected from the group consisting of nitrogen, argon, oxygen or a mixture of one or more of the foregoing. The degasifying section may be provided between the collection zone and the discharge outlet, wherein substances after degasifying are discharged through the discharge outlet. The method may further comprise a first manifold and a second manifold, wherein the first manifold is connected to the plurality of rim nozzles for supplying the fluidizing gas to the plurality of rim nozzles, wherein the second manifold is connected to the plurality of center nozzles for supplying the fluidizing gas to the plurality of center nozzles, wherein the gas flow control comprises a plurality of gas flow regulators for regulating gas flow to each of the plurality of rim nozzles and the plurality of center nozzles.

Still in the foregoing method, each of the plurality of rim nozzles has a first aperture size and each of the plurality of center nozzles has a second aperture size, wherein the first aperture size may be smaller than the second aperture size. The linear fluidizing velocity of the fluidizing gas supplied through the plurality of center nozzles may be about 30% to about 90% of the linear fluidizing velocity of the fluidizing gas supplied through the plurality of rim nozzles. The $TiO_2$-containing slag may comprise alkaline earth metal oxide in an amount from about 0.1 wt % to about 15 wt %. The $TiO_2$-containing slag may comprise alkaline earth metal oxide in an amount from about 3 wt % to about 8 wt %. The molten alkaline earth metal chlorides in the fluidized bed may be maintained at a concentration between 5 wt % and 20 wt %.

Some embodiments relate to a fluidized bed reactor comprising: (a) a reaction zone chamber comprising: (i) an entry port configured to input slag into the reaction zone chamber, and (ii) a bottom surface of the reaction zone chamber comprising first nozzles configured to deliver a fluidizing gas to the reaction zone chamber at a first linear fluidizing velocity; (b) a lower collection chamber comprising a bottom surface comprising second nozzles configured to deliver the fluidizing gas to the lower collection chamber at a second linear fluidizing velocity, wherein the nozzles are configured so that the first superficial velocity of fluidizing gas introduced into the reaction zone is faster than the second superficial velocity of fluidizing gas introduced into the lower collection chamber; (c) an outlet pipe comprising a first end that is connected to the bottom surface of the lower collection chamber, wherein the outlet pipe is configured to remove agglomerated particles that collect in the lower collection chamber; (d) a bottom degasifier section connected to a second end of the outlet pipe, wherein the degasifier section is configured to strip fluidizing gas from agglomerated particles removed from the collection chamber through said outlet pipe by streaming the slag with a purge gas; and (e) a return port connected to the reaction zone chamber, configured to return washed slag back into the reaction zone chamber.

In some embodiments, the fluidizing gas is chlorine gas and the purge gas is nitrogen gas. In some embodiments, the fluidized bed reactor further comprises an upper disengagement section configured to reduce a linear fluidizing velocity of product gases from the reaction zone. In some embodiments, the upper disengagement section is sized to reduce the superficial velocity of product gases leaving the middle reaction zone to 0.03 m/s to 0.10 m/s. In some embodiments of fluidized bed reactors disclosed herein, the nozzles are configured to deliver a fluidizing gas to the reaction zone chamber and the collection chamber are configured so that the linear fluidizing velocity delivered to the collection chamber is between about 30% and about 90% of the linear fluidizing velocity delivered to the reaction zone.

In some embodiments, hole sizes of nozzles configured to deliver a fluidizing gas to the reaction zone chamber are smaller than hole sizes of nozzles configured to deliver fluidizing gas to the collection chamber. In some embodiments, the fluidized bed reactor further comprises an isolation valve on the outlet pipe, wherein a section of the outlet pipe downstream of the isolation valve is isolated from the collection chamber when the isolation valve is closed or wherein agglomerated particles that have accumulated in the collection chamber are able to pass through the outlet pipe.

Some embodiments relate to a process for continuous production of titanium tetrachloride from titanium-bearing slag containing high concentration(s) of alkaline earth metal(s) in a fluidized bed reactor as disclosed herein, comprising: (a) introducing $TiO_2$ containing slag into the fluidized bed reactor; (b) introducing a chlorine gas through the nozzles in the bottom of the reaction zone chamber and through nozzles in the bottom surface of the lower collection zone chamber, wherein the linear fluidizing velocity of gas introduced through the nozzles in the bottom of reaction zone chamber is higher than the linear fluidizing velocity of the gas introduced into the lower collection zone chamber; (c) allowing agglomerated particles of slag to settle into the collection chamber; (d) drawing agglomerated particles periodically from the collection chamber through the output pipe; (e) stripping fluidizing gas from agglomerated particles removed from the collection chamber through said outlet pipe by streaming the agglomerated particles with a purge gas; and (f) leaching alkaline earth metal chlorides in the agglomerated particles away from solid bed particles by dissolving with water.

In some embodiments, the linear fluidizing velocity of the fluidizing gas introduced into the lower collection chamber is 30%-90% of the linear fluidizing velocity of the fluidizing gas introduced into the reaction zone chamber. In some embodiments, the amount of magnesium oxide and/or calcium oxide present in the slag is 0.1-15% by weight. In some embodiments, the amount of magnesium oxide and/or calcium oxide present in the slag is 0.2-6% by weight. In some embodiments, the amount of magnesium oxide and/or calcium oxide present in the slag is 0.5-6% by weight. In some embodiments, the amount of magnesium oxide and/or calcium oxide present in the slag is 1.5-6% by weight. In some embodiments, the fluidizing gas is nitrogen, argon, chlorine, oxygen or a mixture thereof.

In some embodiments, the nozzles in the bottom of the reaction zone chamber and in the bottom surface of the lower collection zone are associated with flow regulators that equalize the flow rate of the fluidizing gas passing through each of the nozzles. In some embodiments, hole sizes of nozzles configured to deliver a fluidizing gas to the reaction zone chamber are smaller than hole sizes of nozzles configured to deliver fluidizing gas to the collection chamber. In some embodiments, the concentration of molten alkaline earth metal chlorides in the fluidized bed is maintained between 5% and 20% by weight. In some embodiments, the concentration of molten alkaline earth metal chlorides in the fluidized bed is maintained between 6% and 8% by weight. Some embodiments of the process further comprise a step of returning washed bed particles back into the fluidized bed reactor.

BRIEF DESCRIPTION OF THE DRAWINGS

Non-limiting examples of some embodiments are found in the accompanying drawings.

DETAILED DESCRIPTION OF EMBODIMENTS

Certain embodiments of the invention will now be described with reference to the accompanying drawings. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the embodiments herein described.

Titanium Chlorination Reaction

According to an embodiment of the invention, titanium tetrachloride ($TiCl_4$) is produced through by chlorinating titanium oxide in a fluidized-bed reactor.

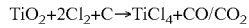

$TiO_2 + 2Cl_2 + C \rightarrow TiCl_4 + CO/CO_2$

Titanium oxide reacts with chlorine and carbon in the form of petroleum coke (used for its low ash and hydrogen content) in a fluidized bed at 1,000° C. to make $TiCl_4$ and $CO/CO_2$. The reaction is fast and exothermic, providing enough heat to be self-sustaining.

According to an embodiment, titanium-bearing slag (with particle size similar to sand) and petroleum coke (with about five times bigger particle size than titanium-bearing slag) are supplied to the fluidized-bed reactor. In embodiments, titanium-bearing slag has 65-95% $TiO_2$ as a major component and other minor components ($Fe_2O_3$, MgO, CaO, $SiO_2$, $Al_2O_3$).

More than 95% of $TiO_2$ in slag is converted into $TiCl_4$, which then leaves the chlorinator along with CO and $CO_2$ gases. Hot $TiCl_4$ leaving the chlorinator is condensed and separated from the CO and $CO_2$. $TiCl_4$ produced from titanium minerals may be oxidized to produce $TiO_2$ for use in the pigment industry. The resulting $TiO_2$ produced may be treated with organic and inorganic compounds to enhance surface properties of the pigment.

Fluidized Bed Chlorination Reaction System

Figure 2:
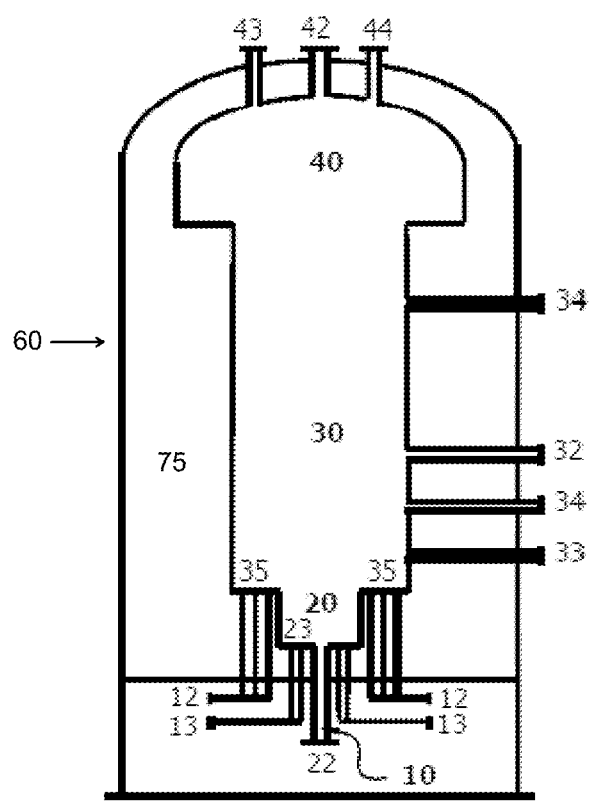
FIG. 2 illustrates a fluidized-bed reactor for titanium chlorination in accordance with an embodiment of the invention.
Figure 3:
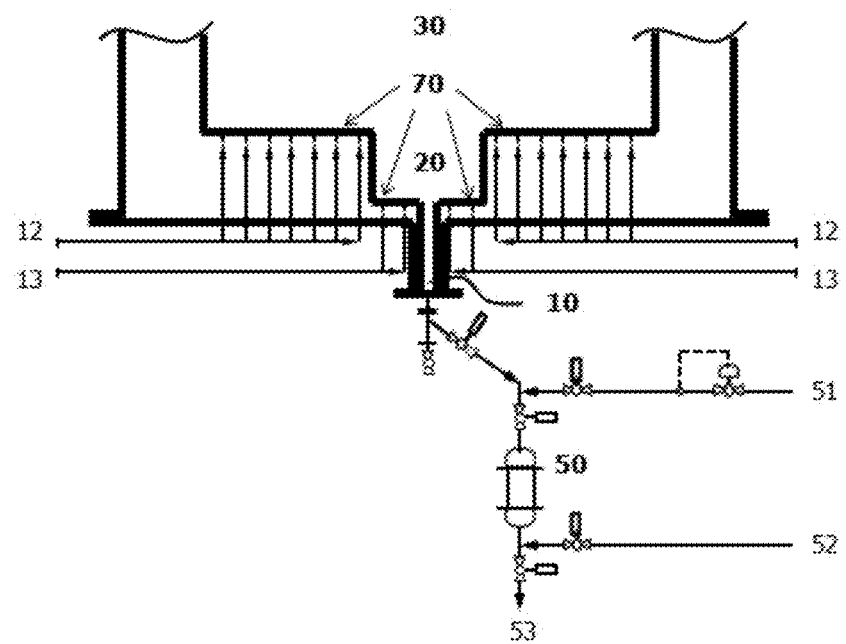
FIG. 3 illustrates a lower portion of the reactor of FIG. 2 in accordance with an embodiment of the invention.

Referring to FIG. 2 and FIG. 3, a refractory reactor 60 includes four reactor sections: top disengagement section 40, middle reaction zone 30, lower collection zone 20, and a bottom degasifier section 10, which will be discussed further below. In embodiments, the reactor 60 has refractory-lined walls and a baseplate 70 that defines the inner space and sections. Baseplate 70 defines the bottom, horizontal surfaces of the middle reaction zone 30 and the lower collection zone 20. The reaction zone 30 has a generally-cylindrical space defined by the refractory-lined walls and the baseplate.

The penetrations through the bottom of the collection zone 20 include the degasifier section 10 and gas inlets 23 for supplying chlorine and/or other process gases to fluidize and cool the bed residue. Penetrations through the side of the reaction zone 30 includes a fresh feed inlet 32 for supplying the feed mixture of coke and slag to the bed, a recycle feed inlet 33 for supplying the recovered feed to the reaction zone 30, and an instrument insert 34 for inserting instrumentation into the reaction zone 30 to monitor the condition of the fluidized-bed. Penetrations through the bottom of the reaction zone 30 include gas inlets 35 for supplying chlorine and/or other process gases to fluidize and react with the coke and metal oxides in the bed. Penetrations through the top and sides of the disengagement section 40 provide a discharge outlet 42 for discharging the reaction results or product gases, a coolant inlet 43 for supplying liquid titanium tetrachloride as coolant, and an instrument insert 44 for inserting instrumentation to monitor the operation. Although not shown, a penetration may be formed through the refractory walls of the reaction zone 30 for use in cleaning the reaction zone 30.

Figure 1:
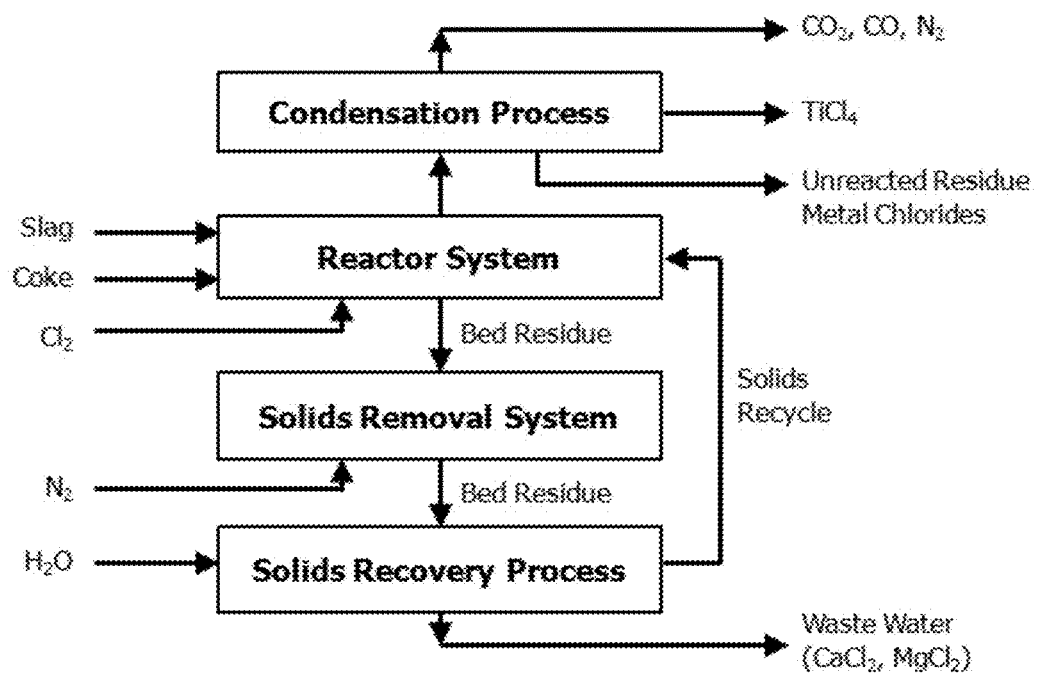
FIG. 1 is a schematic process diagram in accordance with an embodiment of the invention.

Referring to FIG. 1 and FIG. 2, a mixture of slag and coke is fed into the reaction zone 30 through the fresh feed inlet 32 while chlorine gas is fed into the reactor 30 through the gas inlets 23 and 35 to fluidize the reaction bed and react with the coke and metal oxides in the slag. The product gases leave the reactor through the disengagement section 40. Product gases containing metal chloride vapors leave the top of the reactor 60 with entrained solid from the fluidized bed. Product $TiCl_4$ gases are captured by condensation, whereas carbon dioxide, carbon monoxide and nitrogen gas are released. Titanium tetrachloride is separated from the solid and waste gases and recovered as a liquid for purification. Unreacted residue and metal chlorides may be recycled.

Alkaline Earth Metal Oxides

During the carbochlorination reaction, alkaline earth metal oxides (MgO, CaO) are easily converted into $MgCl_2$ and $CaCl_2$), which disadvantageously accumulate in a molten state in the bed due to low volatility. These molten salts, when coated on particle surfaces, prevent chlorine gas contact needed for further reaction, and they accelerate agglomeration of solid particles, resulting in immobilization and plugging of the reaction bed. For a continuous operation, the amount of solid agglomerates must be controlled inside the reactor. In the prior art, most commonly the solid agglomerates or spent bed residues are removed from the reactor periodically. To do so, the reactor must be shut down, and a continuous operation for a long period is difficult. For a longer continuous operation without a stop, the content of MgO and CaO needs to be lower. Fluidized bed reactors and methods of the prior art require the use of titanium slag that contains low levels of MgO and CaO. In certain operations of prior art reactors, the concentration of MgO in the feed stock is limited to an amount of 1.5% or less, and the concentration of CaO is limited to an amount of 0.2% or less. This means that titanium slags having a higher amount of MgO and/or CaO would not be acceptable for these prior art reactors.

Continuous Operation of Reactor by Discharging $MgCl_2$ and $CaCl_2$

According to embodiments of the present invention, a continuous operation of a fluidized bed chlorinator can be accomplished without frequent interruptions for removal of spent bed residue even when the concentration of MgO and CaO is high in the feed stock. In embodiments, the reactor 60 includes collection zone 20 under reaction zone 30. For collection zone 20, in one embodiment, the baseplate 70 is recessed in its central area. In embodiments, the linear fluidizing velocity of gas supplied into the reactor 60 is controlled such that the linear fluidizing velocity at nozzles 25 of the baseplate 70 in the recessed collection zone 20 is lower than the linear fluidizing velocity at nozzles of the baseplate 70 outside the collection zone 30. In embodiments, the agglomerated particles containing high content of molten alkaline earth metal chlorides ($MgCl_2$ and $CaCl_2$)) are collected in the collection zone 20 and discharged from the reactor 60 through a discharge outlet provided in or next to the collection zone 20 while the reactor 60 is running without having to shut down its operation for an extended period of time.

Fluidized Bed Reactor

In embodiments, the fluidized bed reactor 60 is typically a vertical carbon steel pressure vessel, with castable refractory-lined walls or lined with bricks to withstand high temperature and a chlorine environment required to convert $TiO_2$, $Fe_2O_3$, MgO, CaO, $Al_2O_3$ in slag to their respective chlorides. Referring to FIG. 2, the refractory fluidized bed reactor 60 includes a reaction zone, which includes a middle reaction zone 30 and a lower collection zone 20. The reactor 60 further includes an upper disengagement zone 40 and is lined with bricks 75. The diameters and heights of these upper three sections of the reactor are determined by the operating conditions of the process and the desired production capacity.

Middle Reaction Zone

In embodiments, a mixture of coke and slag are fed into the middle reaction zone 30 and ignited. Gas distribution manifolds located at the bottom of the middle reaction zone are configured to feed chlorine gas into the bed, thereby fluidizing the bed. The carbochlorination reaction occurs primarily in the middle reaction zone, at high temperatures between 800° C. to 1000° C. The fluidized bed mixture of coke and slag solid reactants is contained in the reaction zone. The height of the reaction zone is adequate to contain the necessary amount of solid reactants to maintain the chlorine conversion efficiency above 95%.

Upper Disengagement Zone

In embodiments, product gases containing $TiCl_4$ enter the upper disengagement zone 40. The upper disengagement zone 40 serves to reduce the velocity of product gases leaving the reaction zone to between 0.03 m/s and 0.10 m/s. This minimizes solid particulate entrainment in the gas stream leaving the reactor through port 42. Titanium tetrachloride coolant is added through a port 43 to the upper disengagement zone to maintain the temperature of the exiting gases between 800° C. and 1000° C.

Lower Collection Zone

In embodiments, the lower collection zone 20, which is located at the bottom center of the reactor, is specially designed to allow larger agglomerated particles in the hot bed to accumulate. In some embodiments, the lower boundary of the lower collection zone 20 is located below the lower boundary of the middle reaction zone 30. In other embodiments, the lower collection zone 20 may be sequestered from the bottom of the middle reaction zone 30 by a physical barrier. Accumulation of the agglomerated particles in the lower collection zone 20 is promoted by delivering chlorine gas at different linear velocities to the middle reaction zone 30 and the lower collection zone 20 through two gas distribution manifolds.

Gas Distribution Manifolds

In embodiments, the reaction zone gas distribution manifold is located at or under the bottom of the middle reaction zone 30, and a lower collection zone gas distribution manifold is located at or under the bottom of the lower collection zone 20. Both manifolds contain a plurality of nozzles 25, which are distributed evenly across the baseplate 70 and configured to deliver chlorine gas into the bottom of the middle reaction zone 30 and the lower collection zone 20, respectively.

In embodiments, separate gas distribution manifolds are designed to provide different uniform flow rates into the bottoms of the reaction zone 30 and collection zone 20 to fluidize the reaction bed. In embodiments, chlorine and other process gases are introduced into the gas distribution manifolds which provide controlled gas flows through the pipes 12 going through the refractory base to the reaction zone 30 and the pipes 13 going to the lower collection zone 20. In some embodiments, gas flow to each nozzle through the pipes 12 and 13 is controlled using gas flow regulators or control valves such that the pressure drop across multiple nozzles connected to pipes 12 and 13 is about the same. In embodiments, the gas flow regulators or control valves are controlled by a computerized flow control.

Nozzles

Figure 4:
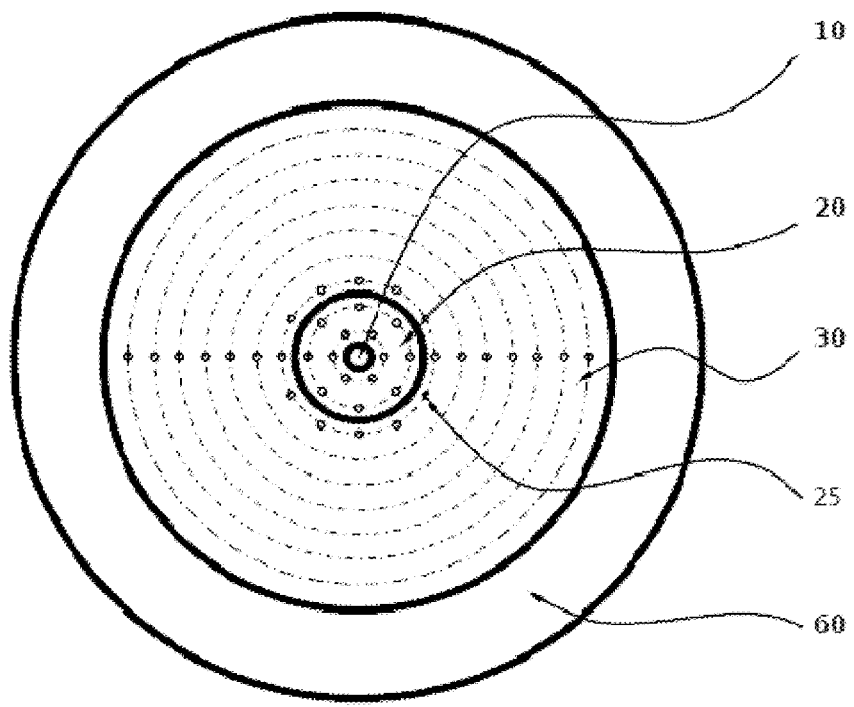
FIG. 4 is a plan view of the baseplate and the refractory-lined walls of the reactor of FIG. 2 in accordance with an embodiment of the invention.

FIG. 3 and FIG. 4 provide detailed schematic diagrams of some embodiments. Fluidizing gas is introduced into reactor through nozzles or bubble caps 25, which are evenly distributed on the bottoms of the middle reaction zone 30 and the lower collection zone 20. The nozzles depicted in FIG. 4 are arranged on baseplate 70 in concentric circular patterns, with representative nozzles shown. In other embodiments, the nozzles may be arranged in other pattern formations resulting in an even distribution of the nozzles across the baseplate 70. The nozzles that are formed through the central recessed surface of the baseplate 70 feed chlorine gas directly to the lower collection zone 20. The nozzles that are formed through the outer rim surface of the baseplate 70 feed chlorine gas directly to the middle reaction zone 30.

Velocity Difference by Nozzles

In embodiments, the linear velocity at the nozzles feeding into the lower collection zone 20 is lower than the linear velocity at the nozzles feeding into the middle reaction zone 30. In embodiments, the aperture size of the nozzles formed through the central recessed surface of the baseplate 70 (feeding directly into the lower collection zone 20) are the same. In embodiments, the aperture size of the nozzles formed through the outer rim surface of the baseplate 70 (feeding directly into the middle reaction zone 30) are the same. In some embodiments, the aperture size for nozzles feeding into the collection zone 20 is larger than the aperture size for nozzles that feed into the reaction zone 30 to provide the differential gas velocities in the middle reaction zone 30 compared to the lower collection zone 20. This velocity difference drives larger agglomerate particles having higher concentrations of alkaline earth metal chlorides to accumulate in the lower collection zone 20 by gravity.

The lower linear fluidizing velocity in the collection zone 20 causes continuous elutriation of agglomerated solid particles from the fluidized bed in the reaction zone 30 into the collection zone 20, which is followed by subsequent removal of the particles from the collection zone 20 of the reactor. Ultimately, the water-soluble alkaline earth metal chlorides remaining in the agglomerated particles in the collection zone 20 are removed, and solid particles without alkaline earth metal chlorides are fed as a recovered feed. Moreover, because of the cooling effect of introducing chlorine gas into the collection zone 20, the agglomerated solid particles are advantageously cooled relative to the temperature of the reaction zone 30.

Degasifier Section

In embodiments, a degasifier section 10 is contiguous with the lower collection zone 20. A portion of the accumulated particles in collection zone 20 fills the degasifier section 10 and is removed through the double-locked discharge pot 50 to maintain the concentration of the molten alkaline earth metal chlorides in the bed between 6% and 8% by weight.

Cold nitrogen gas is fed into the degasifier section 10 to strip chlorine from agglomerated particles collected in the lower collection zone 20. Also agglomerated particles are cooled in the collection zone 20 by the cold chlorine gas, which facilitates the agglomerated particles to settle into and remain in the collection zone 20.

Referring to FIG. 2 and FIG. 3, the outlet pipe 22 of the degasifier section 10 is connected to the isolation valve at the inlet to the discharge pot or double-lock discharge pot 50. Nitrogen gas 51, 52 is added to outlet pipe of the degasifier section 10 just above the isolation valve. A constant flow of nitrogen gas strips and returns the chlorine from the bed residue in the degasifier section and through the collection zone 20 to the middle reaction zone 30 of the chlorinator 60. The bed residue drops into the double-lock discharge pot 50 which feeds the solid to recovery process 53.

Solid Recovery

Agglomerated particles collected in the lower collection zone 20 are removed either continuously or intermittently upon opening of a valve downstream of the collection zone. The particles flow through the valve to a solid recovery process. In some embodiments, a double-lock discharge pot 50 collects the solid, which are easily and safely transferred to the solid recovery process 53.

In some embodiments, bed residue removal rate is controlled by operation of double-lock discharge pot 50. The frequency of filling and discharging of the double lock pot 50 controls the amount of the bed removal. The residue in the double-lock discharge pot 50 is discharged to Storage Hoppers. The agglomerated particles are cooled and fed to an agitated vessel, where the alkali earth metal chlorides such as $CaCl_2$) and $MgCl_2$ are dissolved in water. The slurry is filtered and the collected solid is washed. The washed solid containing mainly slag and coke is dried in a rotary dryer before they are recycled to the chlorination reactor 60 through a nozzle located at the side of the reaction zone 33. The filtrate is neutralized and discharged to a plant waste water treatment facility.

Different Linear Fluidizing Velocities in the Reaction Zone and the Collection Zone In embodiments, the lower collection zone 20 is centered below the reaction zone 30 in a fluidized bed reactor. Separate gas distribution manifolds for the middle reaction zone 30 and the lower collection zone 20 allow different linear fluidizing velocities in the middle reaction zone and the lower collection zone. In particular, the linear fluidizing velocity in the collection zone 20 is lower than the corresponding linear fluidizing velocity in the reaction zone 30.

Linear Fluidizing Velocity in Collection Zone

In embodiments, the differential linear fluidizing velocities in the reaction zone 30 and the collection zone 20 are set or adjusted to permit agglomerated particles to settle into the collection zone 20. In embodiments, the linear fluidizing velocity of gas entering the reaction zone 30 through nozzles outside of the collection zone typically ranges from about 0.09 m/s to about 0.37 m/s.

In embodiments, the linear fluidizing velocity at nozzles in the collection zone 20 typically ranges from about 0.02 m/s to about 0.34 m/s, and allows larger agglomerated bed material to accumulate in the collection zone. In some embodiments, the linear fluidizing velocity at the nozzles in the lower collection zone 20 is about 0.02 m/s, about 0.03 m/s, about 0.04 m/s, about 0.05 m/s, about 0.06 m/s, about 0.07 m/s, about 0.08 m/s, about 0.09 m/s, about 0.10 m/s, about 0.11 m/s, about 0.12 m/s, about 0.13 m/s, about 0.14 m/s, about 0.15 m/s, about 0.16 m/s, about 0.17 m/s, about 0.18 m/s, about 0.19 m/s, about 0.20 m/s, about 0.21 m/s, about 0.22 m/s, about 0.23 m/s, about 0.24 m/s, about 0.25 m/s, about 0.26 m/s, about 0.27 m/s, about 0.28 m/s, about 0.29 m/s, about 0.30 m/s, about 0.31 m/s, about 0.32 m/s, about 0.33 m/s, about 0.34 m/s, or the linear fluidizing velocity in the collection zone is within a range bounded by any two of the preceding numerical values.

Linear Fluidizing Velocity Differential

In embodiments, the linear fluidizing velocities at nozzles in the collection zone 20 and the middle reaction zone 30 are set or adjusted such that the linear fluidizing velocity in the collection zone 20 is substantially lower than the linear fluidizing velocity in the reaction zone 30. In this context, the term "substantially lower" means that the linear fluidizing velocity in the collection zone 20 is lower than the linear fluidizing velocity in the reaction zone 30 by at least 10%.

In some embodiments, the linear fluidizing velocities at nozzles in the collection zone 20 and the middle reaction zone 30 are set or adjusted such that the linear fluidizing velocity in the collection zone 20 is about 30% to 90% of the linear fluidizing velocity in the reaction zone 30 (i.e., the linear fluidizing velocity in the collection zone is about 10% to about 70% lower than the linear fluidizing velocity in the reaction zone). In some embodiments, the lower linear fluidizing velocity in the collection zone 20 about 30%, about 35%, about 40%, about 45%, about 50%, about 55%, about 60%, about 65%, about 70%, about 75%, about 80%, about 85% or about 90% of the velocity in the reaction zone. Depending on the desired linear fluidizing velocity in the collection zone, the linear velocity of the fluidizing gas introduced into the reaction zone is adjusted accordingly higher.

Linear Fluidizing Velocity Differential for Collecting Particles of Certain Sizes In some embodiments, the linear fluidizing velocities are adjusted so that particles having a diameter less than 1 mm collect in the collection zone. In some embodiments, the particles that settle into the collection zone are about 0.5 mm, about 0.6 mm, about 0.7 mm, about 0.8 mm or about 0.9 mm in diameter. In other embodiments, particles having diameters of greater than 1 mm collect in the collection zone. In some embodiments, the conditions are adjusted so that particles having diameters of up to about 2 mm, about 3 mm, about 4 mm, about 5 mm, about 6 mm, about 7 mm, about 8 mm, about 9 mm or about 10 mm collect in the collection zone. In some embodiments, the agglomerated particles have a range of diameters, wherein the range is bounded by any two of the preceding numerical values.

Content of Alkaline Earth Metal Oxides

According to embodiments, the amount of magnesium oxide and/or calcium oxide present in the slag, while still allowing continuous production of $TiCl_4$ from the slag, may be about 0.1 wt % to about 15 wt % by weight. In some embodiments, each of magnesium oxide and calcium oxide is in the amount of 0.1-10 wt %, 0.2-7 wt % or 5-6 wt %. In some embodiments, each of magnesium oxide and calcium oxide tolerated in the slag is independently about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1.0 wt %, about 1.5 wt %, about 2.0 wt %, about 2.5 wt %, about 3.0 wt %, about 3.5 wt %, about 4.0 wt %, about 4.5 wt %, about 5.0 wt %, about 5.5 wt %, about 6.0 wt %, about 6.5 wt %, about 7.0 wt %, about 7.5 wt %, about 8.0 wt %, about 8.5 wt %, about 9.0 wt %, about 9.5 wt % or about 10.0 wt %. In some embodiments, each of magnesium oxide and calcium oxide tolerated in the slag is independently in a range formed by two approximate numbers listed in the immediately preceding sentence. In some embodiments the amount of magnesium oxide and/or calcium oxide tolerated in the slags is within a range bounded by any two of the preceding numerical values. The tolerance for a higher concentration of magnesium oxide and/or calcium oxide makes it possible to use slags mined from a wider range of geographic locations, which tends to be less expensive than slag having low magnesium oxide and/or calcium oxide contents of less than 0.1%.

Control of Molten Alkaline Earth Metal Chlorides in the Bed

During a carbochlorination reaction, molten alkaline earth metal chlorides and nonreactive oxides accumulate in the reaction bed. In particular, alkaline earth metal oxides (MgO, CaO) are easily converted into $MgCl_2$ and $CaCl_2$), which disadvantageously accumulate in a molten state in the bed due to low volatility. These molten salts, when coated on particle surfaces, prevent chlorine gas contact which is needed for further reaction, and they accelerate agglomeration of solid particles, resulting in immobilization and plugging of the reaction bed.

In the reactors and methods disclosed herein, the agglomerated particles are in a fluid state, in that they are able to circulate within the reaction zone 30. As the linear fluidizing velocity of gas entering the reaction zone through the recessed portion of the baseplate 70 below the lower collection zone is lower than the linear fluidizing velocity of gas entering the reaction zone through the outer rim of the of the baseplate 70, the agglomerated particles preferentially settle into the lower collection zone by gravity. The agglomerated particles, which are in a fluid state, settle into the lower collection zone where they may either remain for a period of time in the case when the discharge outlet 22 is blocked, or they may be immediately removed from the lower collection zone if discharge outlet 22 is open.

According to embodiments, the molten alkaline earth metal chlorides are removed and discharged from the reactor 60 by discharging the agglomerated particles containing high content of molten alkaline earth metal chlorides. In embodiments, the discharge or removal is continuous or intermittent by controlling the valve of the discharge outlet. In one embodiment, the intermittent discharge may occur periodic with a regular interval. In another embodiment, the intermittent discharge may be with irregular intervals.

In some embodiments, the discharge of the agglomerated particles containing high content of molten alkaline earth metal chlorides is controlled to maintain a certain level of the molten alkaline earth metal chlorides in the bed. In some embodiments, the concentration of molten alkaline earth metal chlorides in the bed is maintained between about 5% and about 20% by weight. In other embodiments, the concentration of molten alkaline earth metal chlorides in the bed is maintained between about 5% and about 10% by weight or between about 6% and about 8% by weight. In embodiments, the concentration of molten alkaline earth metal chlorides in the bed can be computed using the concentration of the magnesium oxide and calcium oxide in the feed stock and other reaction conditions and parameters.

The reactors and methods disclosed herein permit continuous carbochlorination reaction within the reactor, precluding the need to periodically stop the reaction to purge the bed of agglomerated particles. As discussed, the establishment of fluid bed dynamics within the middle reaction zone and the lower collection zone promote settling of agglomerated particles into the lower collection zone, where they may be removed to prevent obstruction of the reaction bed.

EXAMPLES

The following examples are merely illustrative and are not limiting.

Example 1

A fluidized-bed chlorination reactor having a structure shown in FIG. 2-FIG. 4 is employed. The reactor feed mixture consists of 86% titanium slag and 14% coke.

The following is the composition (by weight) of the ground slag used:

| | |
|---|---|
| $TiO_2$ | 88.0% |
| $Fe_2O_3$ | 8.2% |
| MgO | 1.9% |
| CaO | 1.1% |
| Other ($SiO_2$, $Al_2O_3$) | 0.8% |

At the start of a run 18,000 kg of coke is fed into the reactor. The coke is ignited and 50 m³/h air is added through the gas distribution manifold to sustain the combustion of the coke. When the bed temperature reaches 400° C., the air flow is slowly increased until the coke bed is fluidized. When the fluidized bed temperature reaches 700° C., 11,000 kg of feed is added to the bed at a constant rate maintaining the bed temperature above 600° C. When the bed temperature reaches 800° C., 12,110 kg/h of chlorine gas and 8,350 kg/h of feed mixture is fed into the reactor. The disengagement zone is maintained at 850° C. by adding liquid $TiCl_4$ coolant through the nozzle at the top of the reactor.

Calculated linear fluidizing velocities are about 0.12 m/sec in the 4.0 m diameter reaction zone and 0.08 m/s in the 1.0 m diameter collection zone. After 12 hours of operation, 2,930 kg/h of the bed is withdrawn from the reactor. Periodic samples of the bed are taken and analyzed for alkaline earth metal chlorides content.

Nitrogen gas is added just above the isolation valve at the end of the 80 mm outlet pipe from the 0.3 m diameter degasifier section to the 0.20 m³ double-lock discharge pot to purge the chlorine gas out of the bed residue back to the reactor bed. Then, the solid in degasifier section are transferred by the double-lock discharge pot to the solid recovery system.

The solid is cooled and leached with water to remove water-soluble alkaline earth metal chlorides. The leached slags are filtered and dried. 2,650 kg/h of dried slag having only 0.05 wt % alkaline earth metal chlorides is returned to the reactor through the nozzle located at the side of the reaction zone. The reaction proceeds for 200 hours without clogging and about 15,020 kg/h $TiCl_4$ is produced.

Example 2

A titanium slag with 80.1% $TiO_2$ is used in a fluidized-bed chlorination reactor same as described in Example 1. The reactor feed mixture composition contains 86% titanium slag and 14% coke.

The following is the composition (by weight) of the ground slag used:

| | |
|---|---|
| $TiO_2$ | 80.1% |
| $Fe_2O_3$ | 9.8% |
| MgO | 3.7% |
| CaO | 2.2% |
| Other ($SiO_2$, $Al_2O_3$) | 4.2% |

At the start of the run, 18,000 kg of coke is fed into the reactor. The coke is ignited and 50 m³/h air is added through the gas distribution manifold to sustain the combustion of the coke. When the bed temperature reaches 400° C., the air flow is slowly increased until the coke bed is fluidized. When the fluidized bed temperature reaches 700° C., 11,000 kg of feed is added to the bed at a constant rate maintaining the bed temperature above 600° C. When the bed temperature reaches 800° C., 12,110 kg/h of chlorine gas and 8,350 kg/h of feed mixture are introduced into the reaction zone. The disengagement zone is maintained at 850° C. by adding liquid $TiCl_4$ coolant through a nozzle at the top of the reactor.

Calculated linear fluidizing velocities are about 0.12 m/sec in the 4.0 m diameter reaction zone and 0.08 m/s in the 1.0 m diameter collection zone. After 6 hours of operation, 2,900 kg/h of the bed is withdrawn from the reactor. Periodic samples of the bed are taken and analyzed for alkaline earth metal chloride content.

Nitrogen gas is added just above the isolation valve at the end of the 80 mm outlet pipe from the 0.3 m diameter Degasifier Section to the 0.20 m³ Double-lock Discharge Pot to purge the chlorine gas out of the bed residue back to the reactor bed. Then the solid in degasifier section is transferred by the double-lock discharge pot to the solid recovery system.

The solid is cooled and leached with water to remove water-soluble alkaline earth metal chlorides. The leached slags are filtered and dried. 2,620 kg/h of dried slag having only 0.05 wt % alkaline earth metal chlorides is returned to the reactor through the nozzle located at the side of the reaction zone. The reaction proceeds for 200 hours without clogging and about 13,670 kg/h $TiCl_4$ is produced.

It is understood that the examples and embodiments described herein are for illustrative purposes only and that various modifications or changes in light thereof will be suggested to persons skilled in the art and are to be included within the spirit and purview of this application and scope of any appended claims. All figures, tables, and appendices, as well as publications, patents, and patent applications, cited herein are hereby incorporated by reference in their entirety for all purposes.

What is claimed is:

1. A fluidized bed reaction system comprising:
   a reactor base comprising a center and a rim, wherein the center is recessed relative to the rim;
   at least one reactor wall defining, together with the reactor base, an enclosed space comprising a collection zone and a reaction zone, wherein the collection zone comprises a space within the recessed center of the reactor base, wherein the reaction zone comprises a space above the center and the rim of the reactor base such that the reaction zone is above the collection zone;
   a plurality of center nozzles formed through the recessed center of the reactor base and configured to supply fluidizing gas to the reaction zone via the collection zone;
   a plurality of rim nozzles formed through the rim of the reactor base and configured to supply fluidizing gas directly to the reaction zone; and
   a gas flow control configured to control flow of the fluidizing gas to the plurality of center nozzles and to the plurality of rim nozzles such that a linear fluidizing velocity of the fluidizing gas supplied through the plurality of center nozzles is substantially lower than a linear fluidizing velocity of the fluidizing gas supplied through the plurality of rim nozzles.

2. The system of claim 1, wherein the rim of the reactor base and the center of the reactor base are both substantially horizontal.

3. The system of claim 2, wherein the center is stepped down from the rim, wherein a surface connecting the center and the rim comprises a portion that is generally perpendicular to the center.

4. The system of claim 2, wherein the center of the reactor base is located in a central area of the reactor base and the rim is peripheral to the central area when viewing the reactor base in a direction perpendicular to the center.

5. The system of claim 1, wherein the center is stepped down from the rim, wherein a surface connecting the center and the rim comprises a portion that is generally perpendicular to the center.

6. The system of claim 1, wherein the center of the reactor base is located in a central area of the reactor base and the rim is peripheral to the central area when viewing the reactor base in a direction perpendicular to the center.

7. The system of claim 1, wherein the system is configured to control the linear fluidizing velocity of the fluidizing gas supplied through the plurality of center nozzles to be about 30% to about 90% of the linear fluidizing velocity of the fluidizing gas supplied through the plurality of rim nozzles.

8. The system of claim 1, further comprising a first manifold and a second manifold, wherein the first manifold is connected to the plurality of rim nozzles for supplying the fluidizing gas to the plurality of rim nozzles, wherein the second manifold is connected to the plurality of center nozzles for supplying the fluidizing gas to the plurality of center nozzles, wherein the gas flow control comprises a plurality of gas flow regulators for regulating gas flow to at least one of the plurality of rim nozzles and the plurality of center nozzles.

9. The system of claim 1, wherein one of the plurality of rim nozzles has a first aperture size and one of the plurality of center nozzles has a second aperture size, wherein the first aperture size is smaller than the second aperture size.

10. The system of claim 1, further comprising a discharge outlet in fluid communication with the collection zone and configured for discharging at least part of agglomerated particles collected in the collection zone.

11. The system of claim 10, further comprising a degasifying section recessed from the center and provided between the collection zone and the discharge outlet, wherein the degasifying section is configured for temporarily storing the agglomerated particles from the collection zone and for stripping the fluidizing gas therefrom, wherein the system further comprises a purge gas supply connected to the degasifying section for supplying purge gas into the degasifying section for use in stripping the fluidizing gas.

12. A method of producing titanium tetrachloride, the method comprising:
introducing $TiO_2$-containing slag into a reaction zone of a reactor; and
supplying fluidizing gas comprising chlorine gas to the reaction zone to cause the following reaction within the reaction vessel:

$$TiO_2 + 2Cl_2 + C \rightarrow TiCl_4 + CO/CO_2,$$

wherein the fluidizing gas is supplied via center nozzles formed through a central portion of a reactor base and further via rim nozzles formed through a rim of the reactor base that surrounds the central portion,
wherein the fluidizing gas supplied via the central nozzles is supplied at a first linear fluidizing velocity whereas the fluidizing gas supplied via the rim nozzles is supplied at a second linear fluidizing velocity that is higher than the first linear fluidizing velocity.

13. The method of claim 12, wherein the rim of the reactor base is substantially horizontal, wherein the plurality of rim nozzles are formed through the substantially horizontal rim for supplying fluidizing gas directly into the reaction zone above the rim, wherein the center of the reactor base is substantially horizontal, wherein the plurality of center nozzles are formed through the substantially horizontal center for supplying fluidizing gas into the reaction zone above the center via the collection zone.

14. The method of claim 13, wherein the center is stepped down from the rim, wherein a surface connecting the center and the rim comprises a portion that is generally perpendicular to the center.

15. The method of claim 13, wherein the rim is peripheral to the center of the reactor base when viewing the reactor base in a direction perpendicular to the center.

16. The method of claim 12, further comprising discharging at least part of agglomerated particles settled in the collection zone either continuously or intermittently.

17. The method of claim 16, further comprising temporarily storing the agglomerated particles from the collection zone.

18. The method of claim 16, further comprising supplying purge gas for use in stripping chlorine gas.

19. The method of claim 16, wherein the agglomerated particles contain molten alkaline earth metal chlorides.

20. The method of claim 19, further comprising maintaining the molten alkaline earth metal chlorides at a concentration between 5 wt % and 20 wt %.

* * * * *